Patented June 19, 1923.

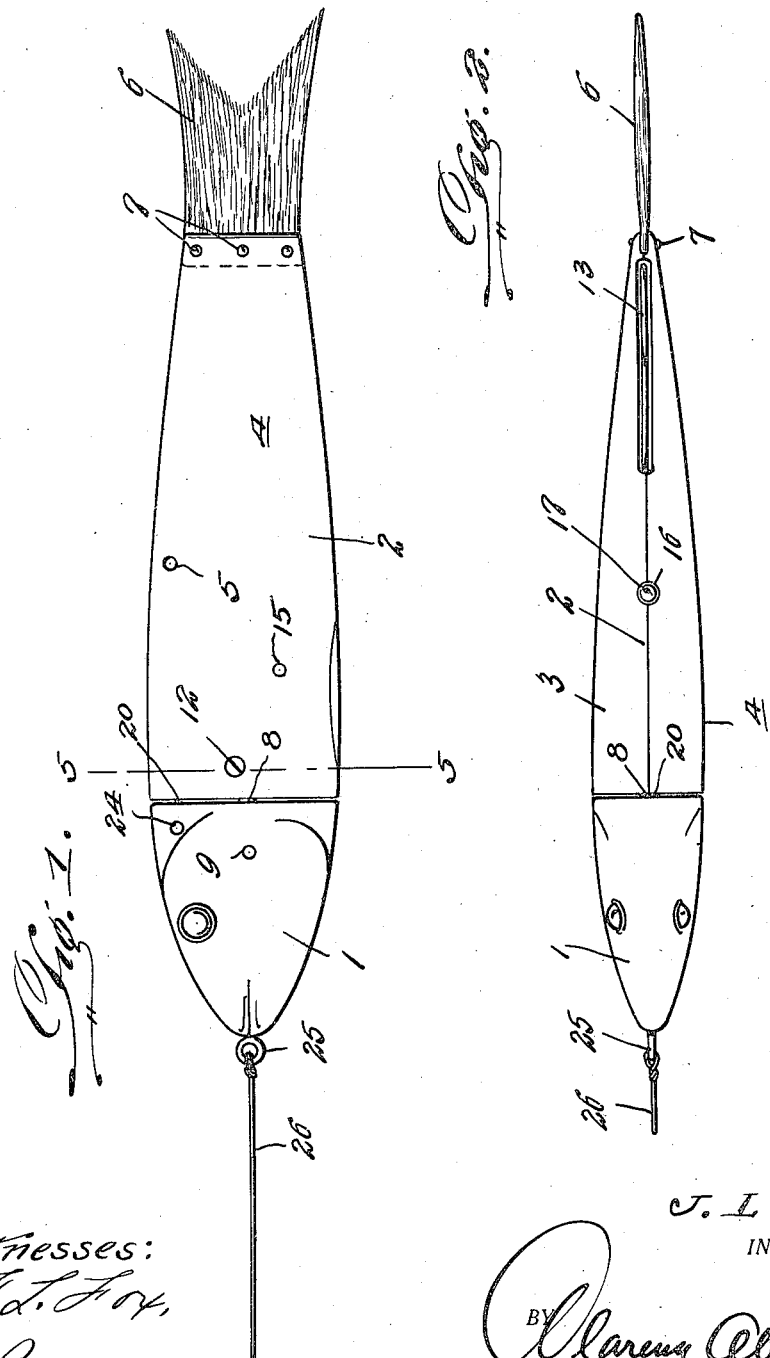

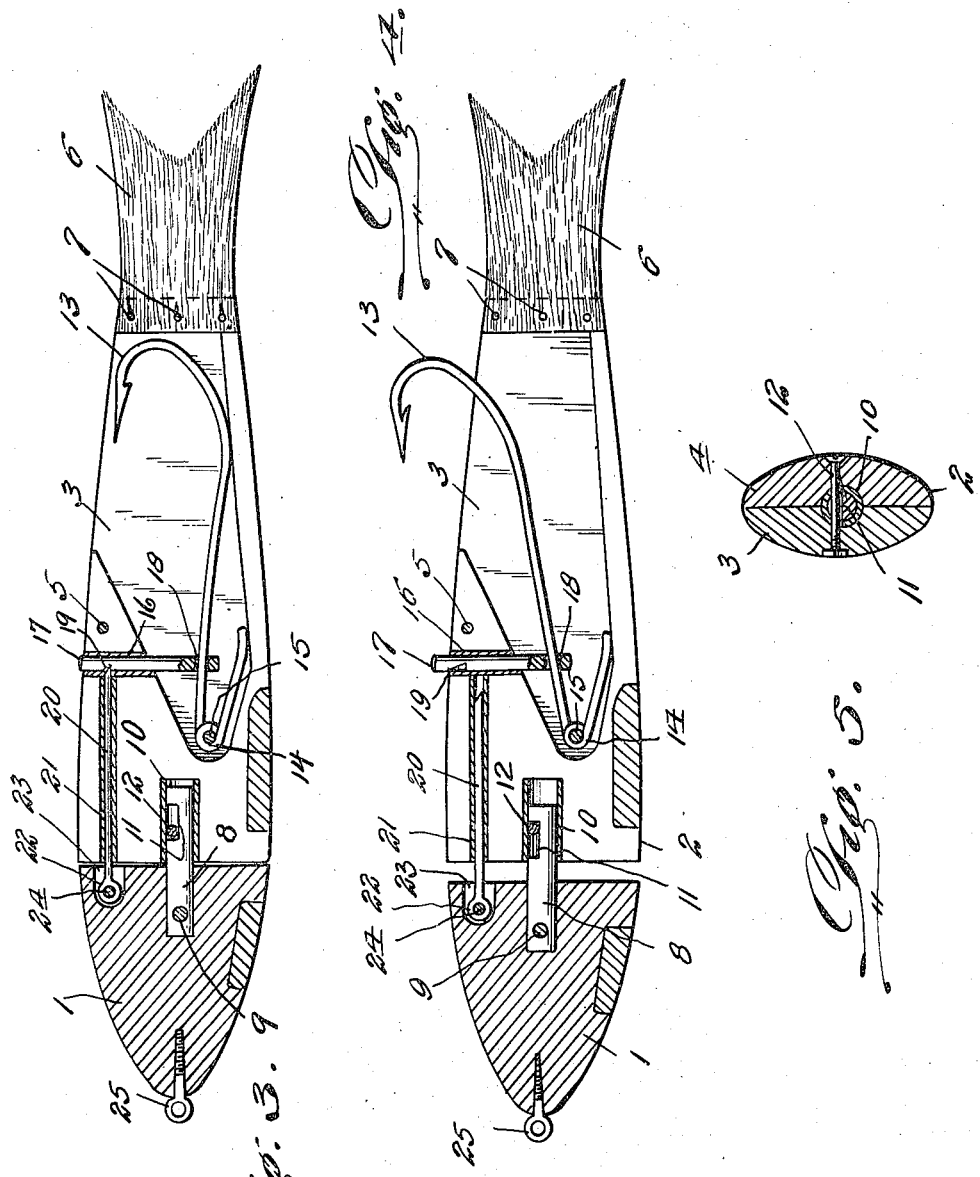

1,459,042

UNITED STATES PATENT OFFICE.

JAY L. WREGE, OF STEARNS, KENTUCKY.

ARTIFICIAL BAIT.

Application filed November 11, 1922. Serial No. 600,221.

*To all whom it may concern:*

Be it known that I, JAY L. WREGE, a citizen of the United States, residing at Stearns, in the county of McCreary and State of Kentucky, have invented certain new and useful Improvements in Artificial Bait, of which the following is a specification.

This invention relates to improvements in artificial bait, and specifically to that type of bait, which is so shaped as to simulate a small fish such as a minnow or the like, and the primary object thereof is the provision of such an article wherein the usual hook carried by these baits is held within the body of the bait so as to prevent the same from gathering weed, sticks or the like whilst being pulled through the water, which is now the great objection to the artificial bait now universally employed.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a side elevational view of an artificial bait constructed in accordance with the present invention.

Figure 2 is a top plan view thereof.

Figure 3 is a longitudinal sectional view through the bait showing the hook member extended within the body of the bait.

Figure 4 is a view similar to Figure 3, showing the hook member projecting outwardly of the body of the bait, and Figure 5 is a transverse cross sectional view upon the line 5—5 of Figure 1.

With particular reference to the drawings, there is shown a fish bait comprising a head section 1 and a body section 2, the head section 1 being preferably formed from a single piece of material and the body member 2 being formed from strips of material 3 and 4 as more clearly shown in Figure 5, to be rigidly secured together in close contact with each other by a transverse securing rivet 5. Further, one end of the body 2 of the bait has a tail 6 secured between the sections 3 and 4 of the body by rivets 7.

Referring particularly to Figures 3 and 4, it will be seen that the head 1 and body 2 are slidably secured to each other through the instrumentality of a short tubular section 8 rigidly secured within the head 1 as at 9 and projecting at its opposite end into a sleeve 10 within the front end of the body 2, and between the sections 3 and 4 thereof. The portion of the short rod section 8 that extends within the sleeve 10 is slotted at its upper surface as at 11 and extending transversely across and within this slotted portion is a pin 12 for permitting of a limited inward and outward sliding movement of the rod 8 within the sleeve.

The adjacent edges of the body sections 3 and 4 are suitably channeled as shown in Figures 3 and 4 and adapted to be received within this channel portion of the body is a fish hook 13 extending forwardly within the body and coiled adjacent its inner end as at 14 around a transversely disposed pin 15 within the body 2. The end of the coiled section 14 of the hook 13 extends downwardly and thence rearwardly within the body of the bait for contact upon the bottom wall of the before mentioned channel portion and in view of this coiled portion, it will be readily understood that the normal tendency of the hook 13 is to extend outwardly of the fish body 2 as shown in Figure 4.

Extending through a vertically disposed sleeve 16 within the body 2 of the bait is a freely slidable pin or rod 17, which pin or rod 17 has an opening 18 adjacent its lower end, for receiving the shank of the hook 13 therethrough. Adjacent the upper end of the pin or rod 17, the same is suitably notched as at 19 for receiving therein one end of a sliding rod 20 positioned within a sleeve 21 extending longitudinally within the body 2 of the bait. The forward end of this rod 20 is eyed as at 22 and extends within a channel or cut away portion 23 of the head 1 of the bait to be therein secured by a pin 24.

In view of the above description, it will be readily appreciated that preliminary to casting the artificial bait into the water, the hook 13 is depressed into the channel portion of the body of the fish, and whenever this hook 13 is so actuated, it will occasion a downward sliding movement of the pin 17 within the sleeve 16 and by moving the head 1 towards the body 2, the locking pin or rod 20 will engage within the notch 19 of the before mentioned pin 17 for retaining the hook interiorly of the body of the bait as clearly shown in Figure 3. Should the fish grasp the body 2 of the bait, it will be readily appreciated that a pull is occasioned between this body and the head 1 for thereby disengaging the locking pin 20 from the sliding pin 17 and consequently allowing the hook 13 to spring outwardly of the fish bait in view of the coiled portion 14 thereof for hooking the mouth of the fish.

It is to be further understood that there is secured in the front end of the head 1 of the bait, an eye screw 25 for receiving one end of the usual fish line 26 and while I have herein shown and described the preferred embodiment of the present invention, it is nevertheless to be understood that minor changes may be made therein, without departing from the spirit and scope of the invention as claimed.

What I claim as new is:—

1. In an artificial bait, a head and body section slidably connected to each other, a hook adapted to be held within the body of the bait, and means within the head and body section for retaining the said hook within the body, said means being displaceable whenever a sliding movement is occasioned in one direction between the head and body of the bait.

2. In an artificial bait, a head and body section slidably connected to each other, a hook secured at one end within the body and adapted to normally project outwardly thereof, a pin slidable within the body and connected at one end to said hook, said pin being notched adjacent the upper end and a rod slidable within the body section and disposed at right angles to said pin, the front end of said rod projecting outwardly of the body and secured to the head section, the opposite end of said rod adapted for engagement with the notch of said pin when the hook is extended within the body for maintaining the same therein.

In testimony whereof I affix my signature.

JAY L. WREGE.